United States Patent [19]

Kasuya

[11] Patent Number: 4,922,088

[45] Date of Patent: May 1, 1990

[54] AUTOMATIC SOLAR LIGHTING APPARATUS HAVING A SOLAR FOLLOWING SENSOR

[75] Inventor: Satoshi Kasuya, Yokohama, Japan

[73] Assignee: Technology Network, Inc., Tokyo, Japan

[21] Appl. No.: 247,391

[22] Filed: Sep. 21, 1988

[30] Foreign Application Priority Data

Sep. 21, 1987 [JP] Japan .............................. 62-236612
Sep. 21, 1987 [JP] Japan .............................. 62-236613
Sep. 21, 1987 [JP] Japan .............................. 62-236614

[51] Int. Cl.$^5$ .............................................. G01J 1/20
[52] U.S. Cl. .................................. 250/203.4; 126/425; 250/208.6
[58] Field of Search ................. 250/203; 126/424, 425

[56] References Cited

U.S. PATENT DOCUMENTS

| | | | |
|---|---|---|---|
| 3,996,917 | 12/1976 | Trihey | 250/203 |
| 4,672,191 | 6/1987 | Cofield | 250/203 |
| 4,742,813 | 5/1985 | Riehl et al. | 126/425 |

Primary Examiner—David C. Nelms
Assistant Examiner—Khaled Shami
Attorney, Agent, or Firm—Oblon, Spivak, McClelland, Maier & Neustadt

[57] ABSTRACT

An automatic solar lighting apparatus having a reflecting means for reflecting the sunlight and a solar following sensor composed of an X-shape cross member having four side grooves, a light shielding top plate disposed on the front end of the X-shape cross member, and photosensors located in the side grooves of the X-shape cross member. The solar following sensor is controlled to be always pointed toward the sun, and the reflecting means can automatically be driven so as to reflect and direct the sunlight toward a prescribed portion for lighting.

9 Claims, 8 Drawing Sheets

AUTOMATIC SOLAR LIGHTING APPARATUS HAVING A SOLAR FOLLOWING SENSOR

BACKGROUND OF THE INVENTION

1. Field of the Invention:

This invention relates to an automatic solar lighting apparatus for automatically directing the sunlight to a prescribed portion by use of a solar following sensor.

2. Description of the Prior Art:

Many attempts have been made to exploit effectively the sunlight for various purposes by use of a solar lighting system. In the solar systems, there are two types for exploiting the sunlight: a solar direct-receptive type for use in a solar system such as a solar power generator using a solar cell panel, and a solar indirect-lighting type for reflecting and directing the sunlight to a specific portion to be lit by use of a reflecting means.

The conventional solar system of the former types can be easily realized with a simple mechanism by which the solar cell panel is controlled merely to face the sun. On the other hand, the latter type is available for various uses because the portion to be lit can be freely determined, while it suffers a disadvantage that the reflecting means must be controlled with a high accuracy so as to equalize the angles of incidence and reflection of the sunlight striking the reflecting means. Thus, since the conventional solar system of this type calls for a complicated control device for changing the angle of reflection of the sunlight relative to the reflecting means in accordance with the sun which moves continuously in the sky, it inevitably turns out to be expensive and susceptible to mechanical troubles during service. Though there is a possibility of utilizing availably the sunlight for supplementary illumination of a room, indoor plant culture or the like, the conventional solar lighting systems have not been of practical use because it necessitates the complicated, expensive control device for the solar reflecting means.

Figure 1:
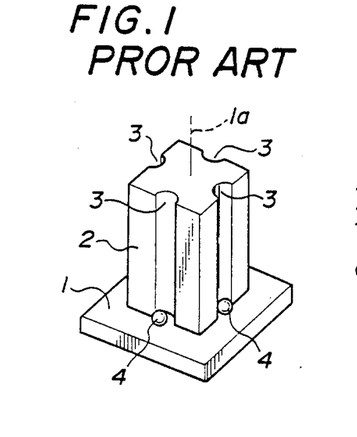
FIG. 1 is a schematic perspective view of a conventional solar following sensor.
Figure 2:
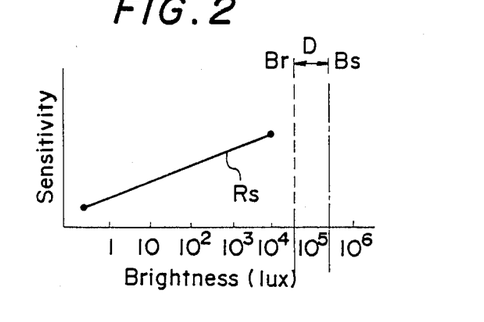
FIG. 2 is an optical characteristic diagram of a common photoelectric light sensor.

One example of conventional solar following sensors for use in the solar system of the solar indirect-lighting type as noted above is illustrated in FIG. 1. This solar following sensor consists of a base plate 1, a light guide square pillar 2 stood on the base plate 1 and provided in its four side surfaces with light guide grooves 3, and photoelectric light sensors 4 disposed on the base plate 1 within the respective light guide grooves 3. In the case where the axis 1a of the square pillar 2 is precisely pointed toward the sun, the sunlight strikes all the light sensors 4 so that the photoelectric outputs from the four light sensors 4 become equal in intensity. On the contrary, if the axis 1a of the square pillar 1 is deviated from the direction to the sun, the photoelectric output from at least one of the light sensors 4 is weakened. By utilizing this phenomenon, the base plate 1 can be easily faced toward the sun. However, as shown in FIG. 2. the brightness Bs of the sunshine and the brightness Br of a bright sky as the background of the sun are over the dynamic sensitivity (characteristics Rs) of a common photoelectric light sensor such as a photo transistor. This means that the difference D in Brightness between the sun and the bright sky is a little and therefore cannot exactly be detected by the photoelectric light sensor. Thus, the conventional solar following sensor makes it difficult to reliably follow the sun because the brightness of the bright sky become noise from which the sunlight cannot be distinguished.

OBJECT AND SUMMARY OF THE INVENTION:

This invention aims at overcoming the aforementioned drawbacks suffered by the conventional solar lighting apparatus. An object of this invention is to provide an automatic solar lighting apparatus capable of reflecting and automatically directing the sunlight toward a prescribed portion to be lit while exactly following the sun, and being operated reliably and manufactured inexpensively by use of a control system having a simple structure for controlling a reflecting means.

Another object of this invention is to provide an automatic solar lighting apparatus using a solar following sensor which can exactly follow the sun without being influenced by the brightness of a bright sky as the background of the sun.

To attain the objects mentioned above, according to the present invention, there is provided an automatic solar lighting apparatus comprising a supporting post capable of rotating horizontally, a solar following sensor which generates no photoelectric output when being pointed toward the sun, a reflecting means supported on the supporting post so as to move vertically, a vertical drive means for vertically rotating the reflecting means, a horizontal drive means for horizontally rotating the supporting post, and a control means for controlling the vertical and horizontal drive means in accordance with the output from the solar following sensor.

The solar following sensor comprises a light shielding top plate, an X-shape cross member having four grooves, and photosensors disposed one within the respective grooves. The solar following sensor can be pointed toward the sun by controlling the vertical and horizontal drive means so as not to generate any photoelectric output in the photosensors disposed on the solar following sensor. If any of photosensors generates the photoelectric output, the solar following sensor is turned to the side of the photosensor which generates the photoelectric output by controlling the vertical and horizontal drive means. When the reflecting means supported by the supporting post is driven to rotate in the vertical direction to follow the sun, it should be inclined at substantially half the angle of elevation of the sun relative to the supporting post. Accordingly, if the sun is at any position in the sky, the sunlight striking the reflecting means is always reflected and directed toward a prescribed portion just under the reflecting means. The sunlight thus directed in one direction is available for lighting a room or the like.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

BRIEF DESCRIPTION OF THE DRAWINGS:

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS:

Before discussing in detail specific embodiments of the present invention, the principle of the solar lighting apparatus according to the present invention will be described with reference to FIG. 3, in which the relation in angle between the sunlight Ls and a vertical axis A along which the sunlight Ls is reflected by a reflecting means 10 to be directed toward a prescribed position P to be lit is illustrated. As is apparent from the drawing, in a case of an elevation angle $\theta$ of the sunlight Ls relative to the vertical axis A, the angle $\alpha$ of the reflecting means 10 relative to the vertical axis A should be made half the angle $\theta$ of the sunlight Ls ($\alpha = \theta/2$) in order to reflect downward the sunlight Ls in the direction of the axis A.

Figures 3, 4:
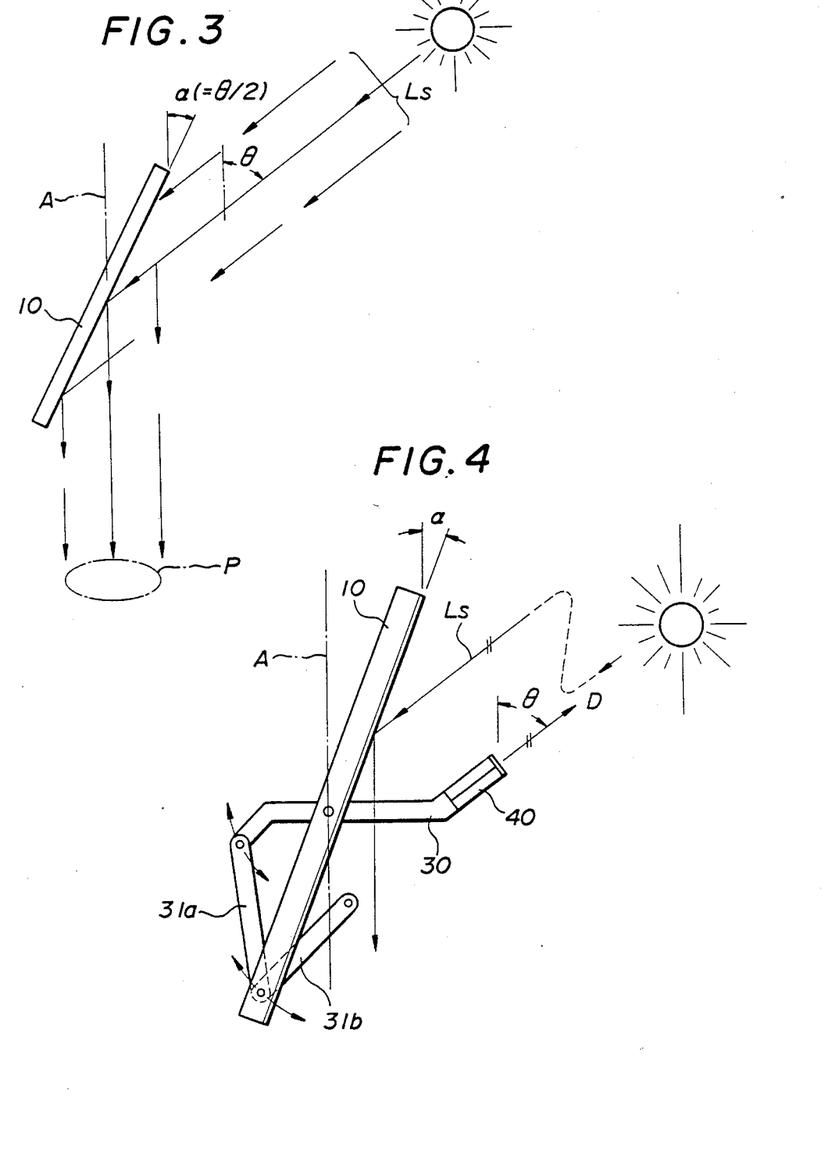
FIG. 3 is an explanatory diagram showing the lighting principle of a solar lighting apparatus according to the present invention.
FIG. 4 is a schematic diagram showing the basic structure of the solar lighting apparatus according to the present invention.

As illustrated schematically in FIG. 4, the automatic solar lighting apparatus according to the present invention essentially comprises the reflecting means 10 and a sensor arm 30 which are together supported rotatably in the horizontal and vertical directions on the axis A. The sensor arm 30 is provided on its front end with a solar following sensor 40 which is controlled so as to be pointed in the direction D toward the sun. The reflecting means 10 is driven by a pair of driving links 31a, 31b so as to be oriented at substantially half the angle $\theta$ of the solar following sensor 40 relative to the axis A. A concrete example for attaining the function noted above will be described with reference to FIGS. 5 and 6.

Figure 5:
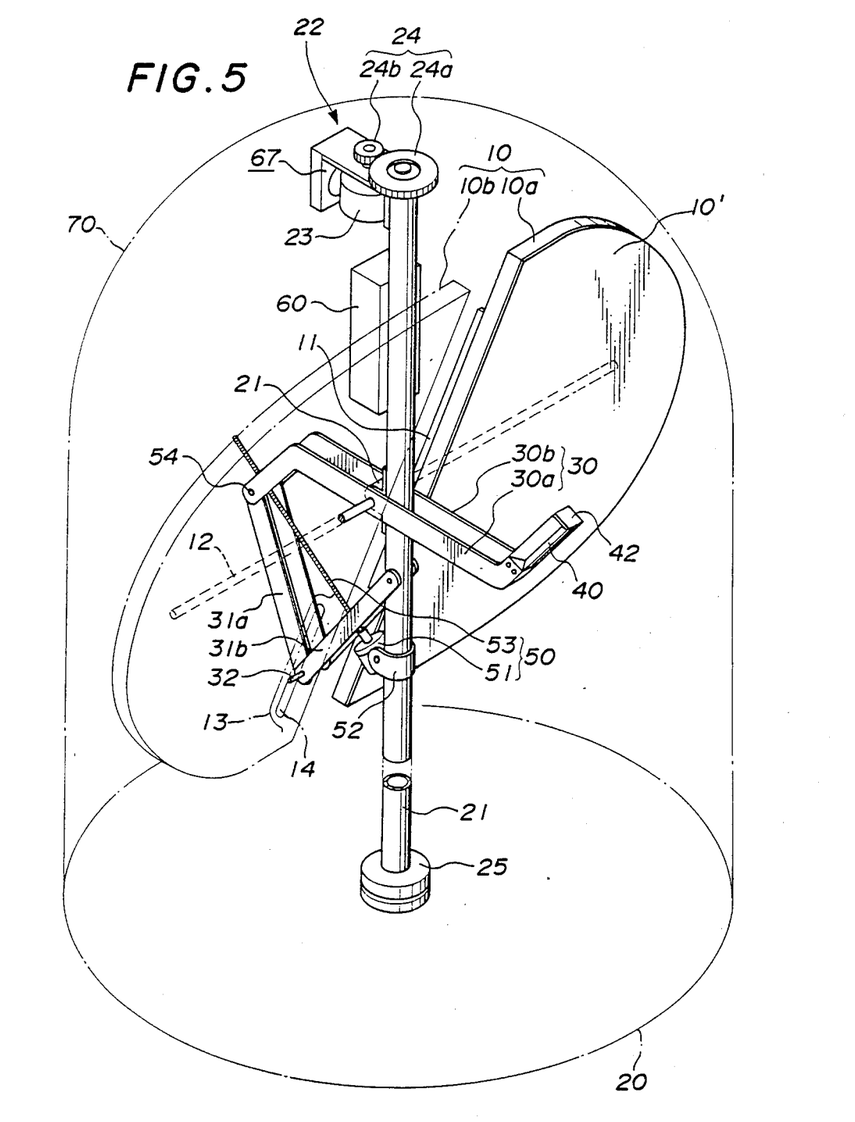
FIG. 5 is a perspective view showing one preferred embodiment of the solar lighting apparatus according to the present invention.
Figure 6A:
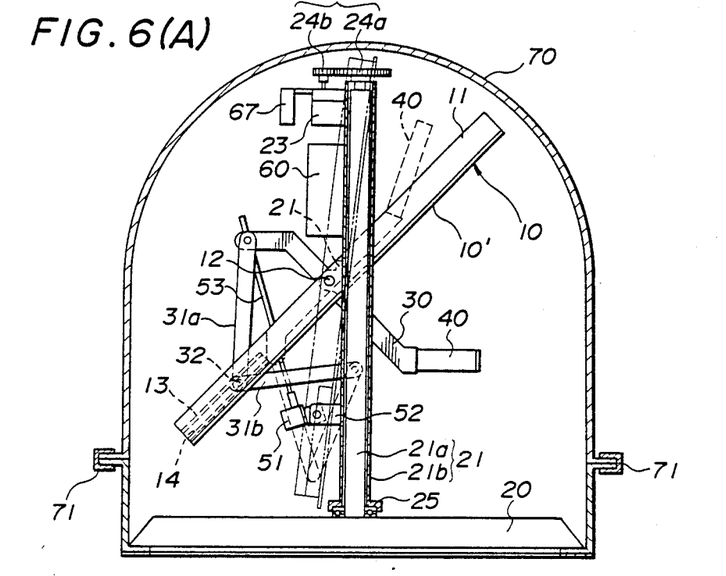
FIGS. 6(A) and 6(B) are a partially sectioned side view and a front view of the same.
Figure 6B:
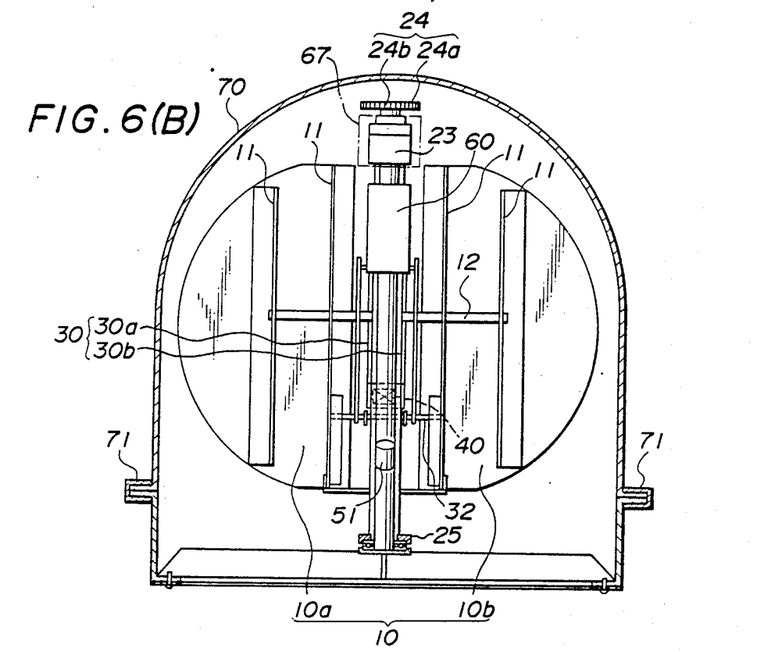

The reflecting means 10 in this embodiment is composed of a pair of reflecting elements 10a, 10b each having a mirror 10' of plate glass, plastic, metal or the like and supported by a supporting post 21 standing perpendicularly on a base 20. In this embodiment, the supporting post 21 is composed of an inner stationary shaft 21a fixed on the base 20 and an outer rotary shaft 21b rotatably disposed on the base 20 through a thrust bearing 25. These shafts 21a, 21b are arranged coaxially. The reflecting means 10 is provided on its back side with frames 11 and a horizontal shaft 12 pivotally supported by a bearing member 22 attached to the supporting post 21 so that the reflecting means 10 is rotatable about the shaft 12 in the vertical direction. The reflecting elements 10a, 10b of the reflecting means 10 each have a guide member 13 having a guide slot 14.

Also, the sensor arm 30 is pivotally supported by the horizontal shaft 12 so as to rotatable about the shaft 12 in the vertical direction. Though the sensor arm 30 in this embodiment is composed of two plate or rod members 30a and 30b between which the supporting post 21 is placed, such a structure of the sensor arm 30 is not particularly limited. Between the rear end of the sensor arm 30 and the supporting post 21, there are connected a pair of driving links 31a, 31b. Thus, with the sensor arm 30 rotating about the shaft 21, the paired driving links 31a, 31b are bent or expanded about guide pin 32. The guide pin 32 for rotatably joining the driving links projects laterally and are slidably inserted in the guide slots 14 formed in the guide members 13 fixed on the back side of the reflecting means 10. Therefore, with the rotation of the sensor arm 30 about the shaft 21, the reflecting means 10 is moved upwardly or downward about the shaft 21 by means of the driving links 31a and 31b. By properly determining the lengths of the driving links 31a and 31b relative to that of the sensor arm 30, a mechanism capable of rotating the reflecting means 10 by half the angle of rotation of the sensor arm 30 can be obtained. That is to say, there can be satisfied the condition that the elevation angle $\alpha$ of the reflecting means 10 always assumes half the elevation angle $\theta$ of the sensor arm 30, i.e. $\alpha = \theta/2$, as shown in FIG. 4. Thus, when the solar following sensor 40 disposed on the front end of the sensor 30 is pointed toward the sun, the sunlight striking the reflecting means 10 is always reflected vertically toward the prescribed portion P to be lit as shown in FIG. 3.

In this embodiment, each of the driving links 31a, 31b is composed of a pair of plate or rod members as illustrated particularly in FIG. 5, but it may be of one plate or rod member.

The solar following sensor 40 having a function of detecting the direction to the sun will be explained with reference to FIGS. 7 and 8. This solar following sensor 40 comprises an X-shape cross member 41 provided on its leading end with a light shielding top plate 42 shaped in a square and fixed on a base plate 43. The X-shape cross member 41 has two diagonal walls which are substantially equal in length to the diagonal line of the light shielding top plate 42 and forms V-shaped longitudinal side grooves 44 on the four sides thereof. On the base plate 43, there are disposed photosensors 45a, 45b, 45c and 45d located one within the respective V-shaped grooves 44 of the X-shape cross member 41. The photosensors 45a–45d have photoelectric elements 46a, 46b, 46c and 46d such as photo transistor.

When the solar following sensor 40 having the structure noted above has its axial direction d pointed accurately toward the sun, the sunlight is prevented from striking all the photosensors 45a–45d by the light shielding top plate 42 disposed on the leading end of the X-shape cross member 41. On the contrary, when the axial direction d of the solar following sensor 40 is deviated from the sun, at least one of the photosensors 45a–45d is exposed to the sunlight to generate a photoelectric output. Therefore, when the photoelectric output is generated by one photosensor, the solar following sensor 40 should be turned to the side of the photosensor generating the photoelectric output. That is to say, when one of the photosensors 45a and 45b which are horizontally opposite to each other across the X-shape cross member 44 generates a photoelectric output, the supporting post 21 is rotated until the photosensor generating the photoelectric output assumes its no-output state, thereby to point the solar following sensor 40 toward the sun. On the other hand, when one of the photosensors 45c and 45d which are vertically opposite to each other across the X-shape cross member 44 generates a photoelectric output, the sensor arm 30 is rotated about the shaft 12 in the vertical direction until the photosensor generating the photoelectric output does not generate the photoelectric output, thereby to point the solar following sensor 40 toward the sun. When one of the sensors 45a and 45b and one of the sensors 45c and 45d together receive the sunlight, the sensor arm 30 and the supporting post 21 are simultaneously rotated to point the solar following sensor 40 toward the sun.

As a driving system for pointing the solar following sensor 40, a vertical drive means 50 for rotating vertically the reflecting means 10 and the sensor arm 30 and a horizontal drive means 22 for rotating horizontally the supporting post 21 are provided.

Figure 9:
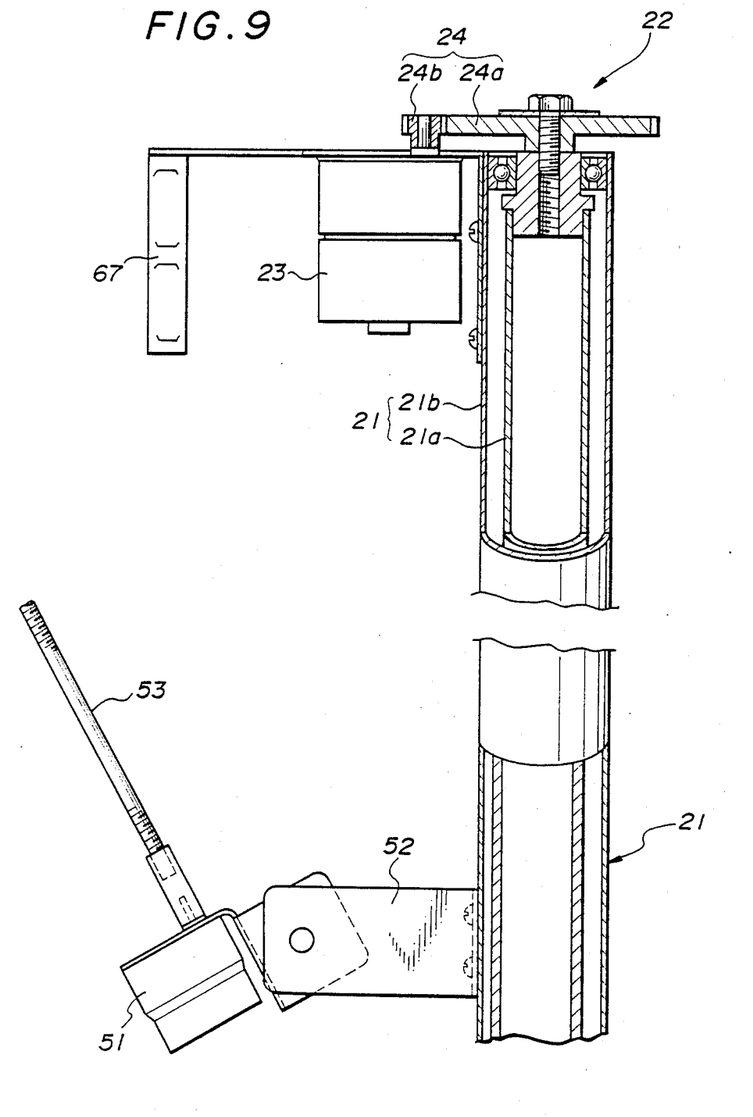
FIG. 9 is a side view showing the state in which vertical and horizontal drive means are mounted.
Figure 10:
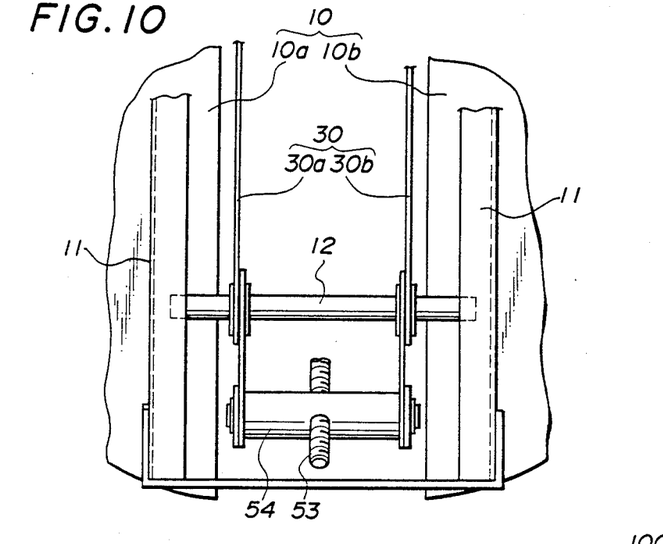
FIG. 10 is an explanatory diagram showing the rear end portion of the sensor arm of the present invention.

The vertical drive means 50 comprises a vertically driving motor 51 rotatably supported by a bearing member 52 fixed to the supporting post 21, and a screw rod 53 extending from the rotary shaft of the driving motor 51 as illustrated in FIG. 9. The screw rod 53 is screwed in a screw bearing 54 functioning as a pivot pin for rotatably joining the sensor arm 30 and the driving link 31a as shown in FIG. 10. Thus, by operating the motor 51 to turn the screw rod 53, the distance between the motor 51 and the screw bearing 54 is changed, while the driving links 31a, 31b are bent or expanded, thereby to move the sensor arm 30 vertically about the shaft 12. That is to day, when the sensor arm 30 is rotated vertically by driving the vertically driving motor 51 to point the solar following sensor 40 toward the sun, the reflecting means 10 is moved by half the angle of rotation of the sensor arm 30 by means of the guide pin 32 disposed at the connection point of the driving links 31a and 31b, thereby to reflect and accurately direct the sunlight toward the desired portion.

The horizontal drive means 24 comprises a horizontally driving motor 23 disposed at the top of the supporting post 21, and a transmitting means 24 including gears 24a, 24b for transmitting the rotary motion produced by the motor 23 to the supporting post 21. As stated above, the supporting post 21 is composed of the inner stationary shaft 21a and the outer rotary shaft 21b to which the reflecting means 10 and the sensor arm 30 are rotatably attached. Thus, the motor 23 is mounted on the outer rotary shaft 21b and the gear 24b fitted to the motor shaft of the motor 23 is engaged with the gear 24a fixed on the inner stationary shaft 21a, so that the other rotary shaft 21b can be moved around the inner stationary shaft 21a by operating the motor 23. As a result, the reflecting means 10 and the sensor arm 30 are together rotated horizontally about the supporting post 21.

Furthermore, onto the supporting post 21, there is fixed a control unit 60 for controlling the motors 23 and 51 in accordance with the photoelectric output generated from at least one of the photosensors 45a-45d of the solar following sensor 40. As shown by a block diagram of FIG. 11, the control unit 60 has amplifiers 62a-62d for respectively amplifying the photoelectric outputs from the photosensors 45a-45d, and control circuits 64' and 64" for the motors 23 and 51. In the control circuits 64' and 64", a driving current for the motors 23 and 51 from a power source 66 is regulated in accordance with the photoelectric outputs from the photosensors 45a-45d and fed to the motors 23 and 51 so as to rotate the reflecting means 10 about the shaft 12 until all the photosensers 45a-45d do not receive the sunlight. Consequently, the solar following sensor 40 can be accurately pointed toward the sun. When the sunlight strikes one of the photosensors sensors 45a-45d, one of the motors 23 and 51 is correspondingly operated to move the solar following sensor 40 to the side of the photosensor generating the photoelectric output. When one of the photosensors 45a and 45b and one of the photosensors 45c and 45d generate photoelectric outputs at one time, the motors 23 and 51 are operated simultaneously in the manner described previously. In the drawings, reference numeral 67 denotes a cooling fan which is operated when a thermostat 67 incorporated in the control unit 60 detects overheating of the apparatus.

Since the automatic solar lighting apparatus having the structure noted above according to the present invention is generally installed outdoors, the apparatus including the reflecting means 10 may be preferably covered with a transparent dome 70 as shown in FIGS. 6(A) and 6(B). It is convenient to divide the dome 70 into upper and lower halves which are coupled by a retainer means 71.

Figure 12:
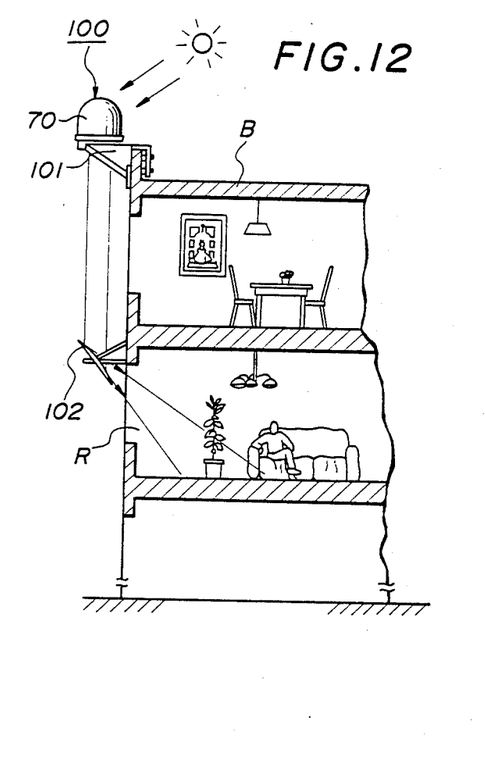
FIG. 12 is a schematic diagram showing one example of application of the solar lighting apparatus according to the present invention.
Figure 13:
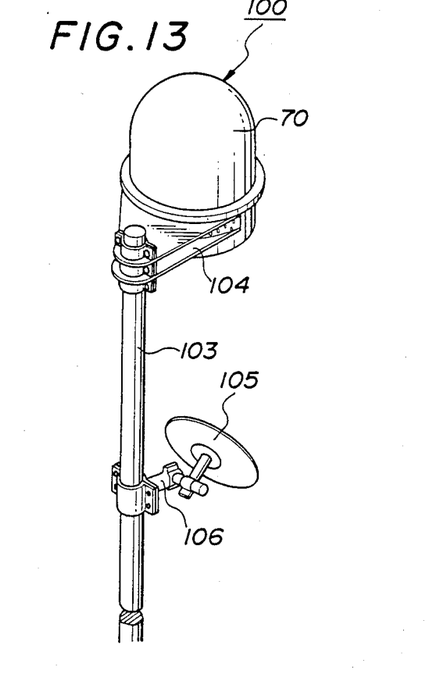
FIG. 13 is a perspective view showing another example of application of the solar lighting apparatus according to the present invention.

The solar lighting apparatus thus covered with the dome 70, designated by the reference numeral 100 in FIG. 12, is installed on the edge portion of the rooftop of a building B by use of a fixing means 101 by way of example. As mentioned above, the sunlight is reflected by the solar lighting apparatus 100 and directed downward along the outer wall of the building B. If a reflector 102 is disposed by the side of a window at a fixed angle as illustrated, the sunlight reflected downward by the solar lighting apparatus can be introduced into a room R to be lit up. In a case where the solar lighting apparatus 100 cannot be installed on the rooftop of the building, it may be fixed on the top of a mast 103 by use of a fixing means 104 as illustrated in FIG. 13. Also in this case, it is preferable to use an auxiliary reflector 105 fixed to the mast 103 by use of a fixing means 106 for directing the sunlight toward the desired portion.

Figure 14:
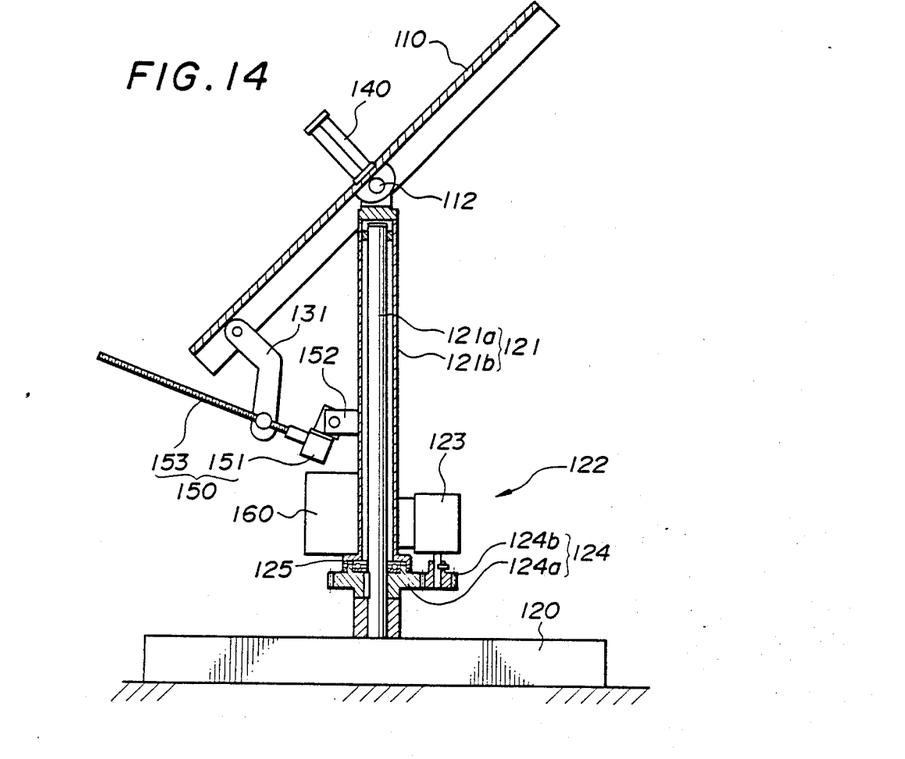
FIG. 14 is a cross-sectioned side view showing another embodiment of the present invention.

FIG. 14 illustrates another embodiment of the automatic solar lighting apparatus according to this invention. This solar lighting apparatus serves to reflect the sunlight in a desired direction. A reflecting means 110 in this embodiment is mounted rotatably about a pivot pin 112 on the top of a supporting post 121. The supporting post 121 is composed of an inner stationary shaft 121a fixedly stood on a base 120 and another rotary shaft 121b rotatably fixed on the base 120 through a thrust bearing 125, similarly to the preceding embodiment described above. Onto the outer rotary shaft 121b, there is mounted a horizontal drive means 122 comprising a horizontally driving motor 123 and a motion transmitting means 124 such as gears 124a, 124b. Thus, by operating the motor 123, the outer rotary shaft 121b is rotated around the inner stationary shaft 121a together with the reflecting means 110.

Figure 7:
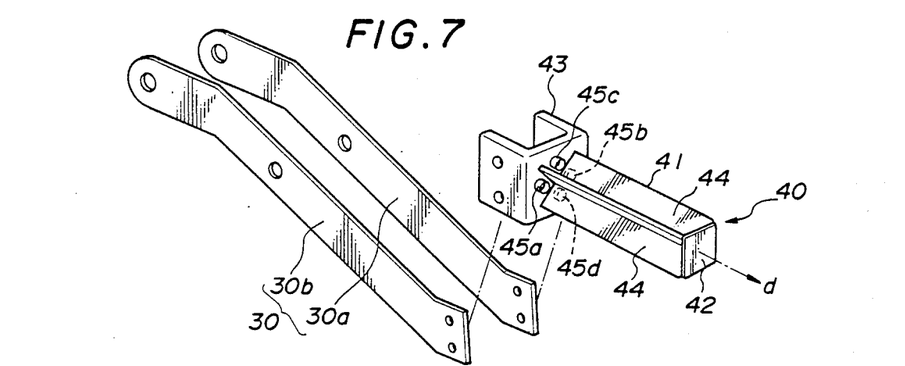
FIG. 7 is an explanatory diagram showing the state in which a solar following sensor is attached to a sensor arm in the present invention.
Figure 8A:
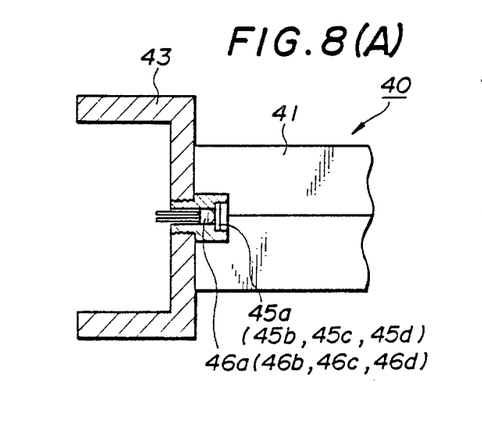
FIGS. 8(A) and 8(B) are a cross sectioned side view and a front view of the solar following sensor.
Figure 8B:
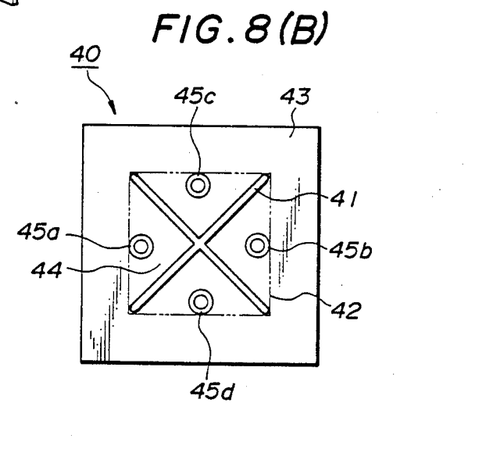
Figure 11:
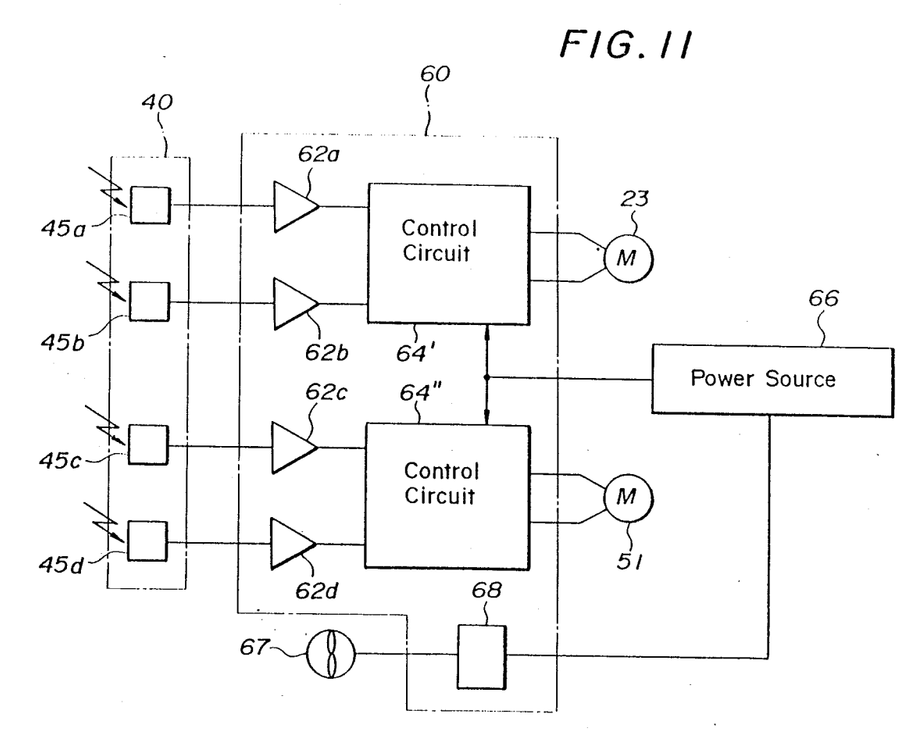
FIG. 11 is a block circuit diagram of a control unit of the present invention.

The solar following sensor 140 in this embodiment has the same structure as that shown in FIG. 7 and disposed perpendicularly on the reflecting means 110. A driving link 131 is rotatably connected at its one end to the reflecting means 110 and at the other end thereof to a screw rod 153 of a vertical drive means 150. A screw rod 153 is rotated by a vertically driving motor 151 to move the reflecting means 110 in the vertical direction. Denoted by numeral 150 is a control unit identical to that used in the preceding embodiment as shown in FIG. 11. Therefore, similarly to the preceding embodiment, when at least one of the photosensors of the solar following sensor 140 receives the sunlight, the control unit 160 operates to drive the horizontal drive means 122 and/or vertical drive means 150 so as to move the reflecting means 110 in conformity with the condition as illustrated in FIG. 4.

Figure 15:
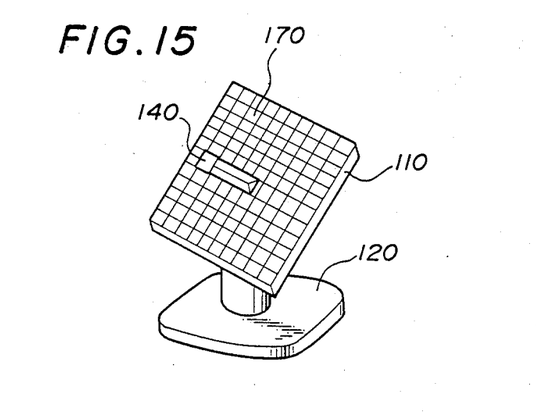
FIG. 15 is a perspective view of still another embodiment of the present invention.

FIG. 15 illustrates still another embodiment in which the apparatus shown in FIG. 14 has a plurality of solar cells 170 applied to the entire upper surface of the reflecting means 110. This embodiment provides a high efficient solar power system in which the solar cells on the reflecting means are always faced toward the sun.

As is clear from the foregoing, according to the present invention it is possible to reflect and automatically direct the sunlight toward a prescribed portion continuously by use of a simple mechanism including a reflecting means and a control unit and provide a solar lighting apparatus having great practical utility. Besides, since the solar following sensor is composed of the X-shape cross member and the light shielding top plate as mentioned previously, it can reliably follow the sun without being influenced by brightness of a bright sky on the background of the sun.

As can be readily appreciated, it is possible to deviate from the above embodiments of the present invention and, as will be readily understood by those skilled in this art, the invention is capable of many modifications and improvements within the scope and spirit thereof. Accordingly, it will be understood that the invention is not to be limited by these specific embodiments, but only by the scope and spirit of the appended claims.

What is claimed is:

1. An automatic clear lighting apparatus comprising:
    a rotatable supporting post;
    a solar following sensor consisting of an X-shape cross member having four side grooves and provided on its front end with a light shielding top plate, and photosensors each located on the inner part of the respective side grooves of said x-shape cross member, said photosensors all being completely shaded by said light shielding top plate and being brought into a no-output state when said solar following sensor is directed toward the sun, said solar following sensor serving to generate a photoelectric output from at least one of said photosensors when being deviated from a direction toward the sun;
    at least one driving link;
    a reflecting means supported rotatably on said supporting post so as to be operated to rotate vertically by means of said driving link; a vertical drive means supported on said supporting post for moving said reflecting means in an axial direction of said supporting post;
    a horizontal drive means for rotating said solar following sensor and reflecting means about said supporting post; and
    a control unit for controlling said vertical and horizontal drive means in accordance with the photoelectric output from at least one of said photosensors of the solar following sensor.

2. An automatic solar lighting apparatus according to claim 1, further comprising a sensor arm supported rotatably on said supporting post and having a front end to which said solar following sensor is attached and a rear end to which said driving link is connected, and a second driving link connected at its one end to said drive link and at the other end thereof to said supporting post.

3. An automatic solar lighting apparatus according to claim 1, wherein said supporting post is composed of an inner stationary shaft fixedly standing on a base, and an outer rotary shaft on which a horizontally driving motor is mounted for rotating horizontally said outer rotary shaft.

4. An automatic solar lighting apparatus according to claim 2, wherein said vertical drive means is composed of a vertically driving motor supported rotatably on said supporting post, a screw bearing disposed on the rear end of said sensor arm, a screw rod which is rotated by said vertically driving motor and rotatably screwed in said screw bearing so as to rockingly move said sensor arm by rotating said screw rod.

5. An automatic solar lighting apparatus according to claim 3, wherein said vertical drive means is composed of a vertically driving motor supported rotatably on said supporting post, a screw rod which is rotated by said vertically driving motor so as to rockingly move said reflecting means by rotating said screw rod.

6. An automatic solar lighting apparatus according to claim 2, wherein said reflecting means has guide members each having a guide slot, and said driving links are provided with a guide pin being slidably inserted into said guide slots.

7. An automatic solar lighting apparatus according to claim 1, wherein said solar following sensor is disposed perpendicularly on said reflecting means.

8. An automatic solar lighting apparatus according to claim 7, wherein said reflecting means is provided on its upper surface with solar cells.

9. An automatic solar lighting apparatus comprising:
    a solar following sensor comprised of an X-shape cross member having four side grooves, a light shielding top plate disposed on said X-shape cross member, and photosensors each located on the inner part of the respective side grooves of said X-shape cross member, said photosensors all being completely shaded with said light shielding top plate to be brought into its no-output state when said solar following sensor is directed toward the sun;
    a reflecting means for reflecting the sunlight;
    driving link means by which said reflecting means is connected with said solar following sensor so as to allow said reflecting means to rotate at half the rotating angle of said solar following sensor;
    a vertical direction means for rotating said reflecting means in one direction; and
    a horizontal drive means for rotating said reflecting means in a direction perpendicular to the direction in which said reflecting means is rotated by said vertical drive means.

* * * * *